United States Patent [19]

Claussen et al.

[11] Patent Number: 4,947,581

[45] Date of Patent: Aug. 14, 1990

[54] SPRAY SHIELD ASSEMBLY

[75] Inventors: Steven W. Claussen, Clontarf Township, Swift County; William A. Schwendemann, Jr., Cashel Township, Swift County, both of Minn.

[73] Assignee: C.A.P., Inc., Benson, Minn.

[21] Appl. No.: 327,558

[22] Filed: Mar. 23, 1989

[51] Int. Cl.[5] ............................................. B05B 1/20
[52] U.S. Cl. ....................................... 47/1.7; 239/175
[58] Field of Search .................... 47/1.7; 239/172, 175

[56] References Cited

U.S. PATENT DOCUMENTS 1,669,435  5/1928  Wheeler .............................. 47/1.7
4,736,888  4/1988  Fasnacht ............................ 239/175

OTHER PUBLICATIONS

Ryan Manufacturing sales brochure.

Hiniker Company sales brochure.

Primary Examiner—Henry E. Raduazo
Assistant Examiner—Michele A. VanPatten
Attorney, Agent, or Firm—William L. Heubsch

[57] ABSTRACT

A spray shield assembly adapted to be moved over row crops to temporarily enclose the crops when liquids are sprayed onto them or the ground around them, which assembly includes a liquid distribution system for distributing liquid to outlet nozzles, and a polymeric shield defining a channel opening through one side and front and rear ends of the shield for receiving the crops. The shield has a converging leading portion for directing portions of plants into the channel, and a semi cylindrical portion in which the nozzles are mounted, with two of the nozzles in one of an array of openings in opposite sides of the shield, which arrays of openings allow adjusting the location of the nozzles to accommodate the portion of the plants desired to be sprayed.

17 Claims, 3 Drawing Sheets

SPRAY SHIELD ASSEMBLY

TECHNICAL FIELD

The present invention relates to spray shield assemblies adapted to be moved over row crops so as to temporarily enclose the crops when liquids or agricultural chemicals such as herbicides, insecticides or fungicides are sprayed onto them to help insure that a high percentage of the sprayed liquids are deposited on or around the plants rather than being blown away.

BACKGROUND ART

Spray shield assemblies are known (i.e., spray shield assemblies from Ryan Manufacturing, Box 239, Newark, Illinois 60541 or Hiniker Company, P.O Box 3407, Mankato, Minn. 56001) that are adapted to be attached to a frame moved over the crops or plants and that comprise liquid distribution means including an inlet adapted to be coupled to a source of liquid under pressure (e.g., a liquid pumping system on a tractor to which the frame is attached), two or three liquid outlet nozzles, and means (e.g., hoses and hose connectors) for distributing liquid from the inlet to the outlet nozzles. Such spray shield assemblies have also each included a resiliently flexible shield (e.g., of a polymeric material or metal) defining a channel opening through one side and front and rear axially spaced ends of the shield, in which channel the crops or plants are temporarily positioned as the shield is moved over them, which channels have had semi cylindrical or semi rectangular cross sections, and means attached to a top part of the shield for suspending the shield from the support frame with edges along the open side of the shield adjacent the earth and for affording movement of the shield toward the rear of the frame and upward upon contact of its front end with the earth or an obstacle on the earth. Also, means are provided on those shield assemblies for mounting the outlet nozzles on the shields to position the nozzles with their outlet ends projecting from the inner surface of the spray shields to direct spray from the nozzles onto crops or plants in the shields.

In these known spray shield assemblies, however, the outlet nozzles are mounted at fixed locations relative to the shields, and can not be positioned at significantly different locations to accommodate crops or plants of different sizes or a desire to spray liquids at different locations on plants within the shield. Also, the spray shields have generally uniform cross sections along their lengths and have relatively square leading edges between their edges that define the bottom edges and leading edges of the shield, which structural combination does little to either minimize damage that might be caused by engagement of the leading edges of the shields with parts of plants that project past the sides of paths of the shields as the shields moves over them, or minimize the impact on the shield assemblies caused by contact of the spray shields with the earth or objects along rows of the crops or plants over which the spray shields are moved.

DISCLOSURE OF INVENTION

The present invention provides a spray shield assembly adapted to be moved over row crops to temporarily enclose the crops when liquids or agricultural chemicals such as herbicides, insecticides or fungicides are sprayed onto them to help insure that a high percentage of the sprayed liquids are deposited on or around the plants rather than being blown away, which spray shield assembly is of an inexpensive design that provides adjustment to adapt the location of the liquid spray sources within the shield to the size or shape of the crops being sprayed, is designed to restrict damage to plants that may have portions that project beyond the sides of the path for the spray shield, and is designed to be minimally effected by contact with the earth or objects along the rows. The spray shield assembly according to the present invention is adapted to be attached to a frame moved over the crops or plants and comprises liquid distribution means including an inlet adapted to be coupled to a source of liquid under pressure (e.g., a liquid pumping system on a tractor to which the frame is attached), at least two and preferably three liquid outlet nozzles, and means (e.g., hoses and hose connectors) for distributing liquid from the inlet to the outlet nozzles. Also included in the spray shield assembly is a resiliently flexible polymeric shield (e.g., a spin or rotary molding of polyethylene) defining a channel opening through one side and front and rear axially spaced ends of the shield, in which channel the crops or plants are temporarily positioned as the shield is moved over them. The shield includes a leading portion that converges axially from the adjacent the front end toward the rear end of the shield to, if necessary, help direct or funnel portions of plants into the channel, and a semi cylindrical portion extending from the end of the converging leading portion opposite the front end of the shield toward the rear end of the shield. The semi cylindrical portion has spaced opposite side parts joined by a central top part and has spaced generally parallel edges that define the open side of the channel. Each of the side parts has an array of through openings with the openings in each array each disposed at a different distance from the adjacent edge. Means attached to the top part are provided for suspending the shield from the support frame with the edges adjacent the earth and for affording movement of the shield toward the rear of the frame and upward upon contact of its front end with the earth or an obstacle on the earth; and means are provided for mounting one of the outlet nozzles in one of the through openings in each of the arrays to position the nozzles with their outlet ends projecting from the inner surface of the spray shield to direct spray from the nozzles in generally opposite directions at desired locations and orientations relative to the edges and thereby to the plants along the rows. The top part also has a through opening through which the third outlet nozzle is mounted so that it projects from the inner surface of the spray shield and directs spray in generally at a right angle to the opposite directions in which spray from the nozzles in the side parts are directed.

Preferably, the arrays and the central opening are spaced axially from each other along the longitudinal axis of the shield to restrict interference between liquid spray being discharged from the nozzles.

Also, preferably the leading converging portion of the shield has convex arcuate edges extending from the edges of the semi cylindrical portion to the front end of the shield to provide cam surfaces adapted to both resiliently spread the side parts of the spray shield adjacent the arcuate edges and lift the spray shield upon engagement of the cam surfaces with the earth or an obstacle on the earth to thereby minimize the impact on the shield caused by such engagement; and the shield has a flange projecting radially inwardly at the rear end of the shield to help retain the shape of the shield and restrict vibration of its sides during use.

BRIEF DESCRIPTION OF THE DRAWING

The present invention will be further described with reference to the accompanying drawing wherein like reference numerals refer to like parts in the several views, and wherein.

DETAILED DESCRIPTION

Figure 1:
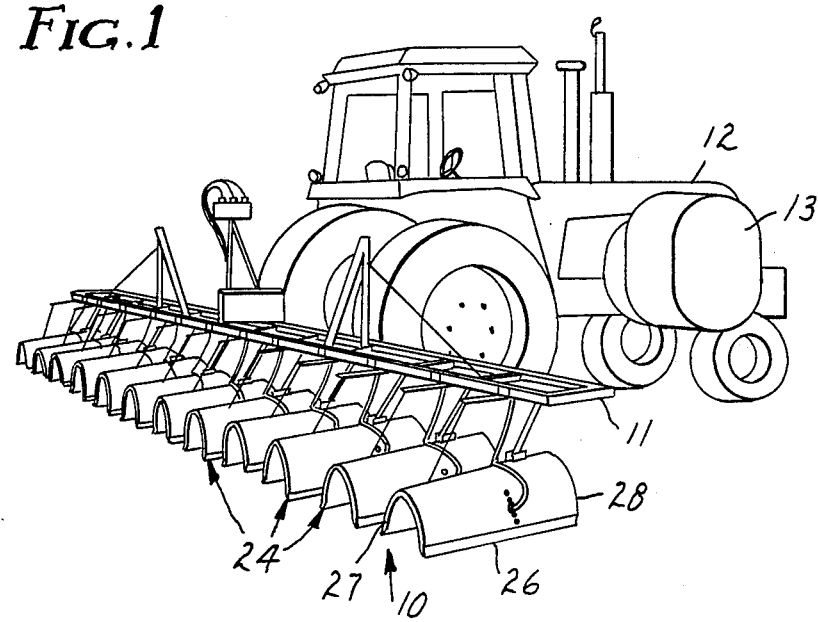
FIG. 1 is a perspective view of a plurality of spray shield assemblies according to the present invention shown attached to frame mounted on a tractor.
Figure 4:
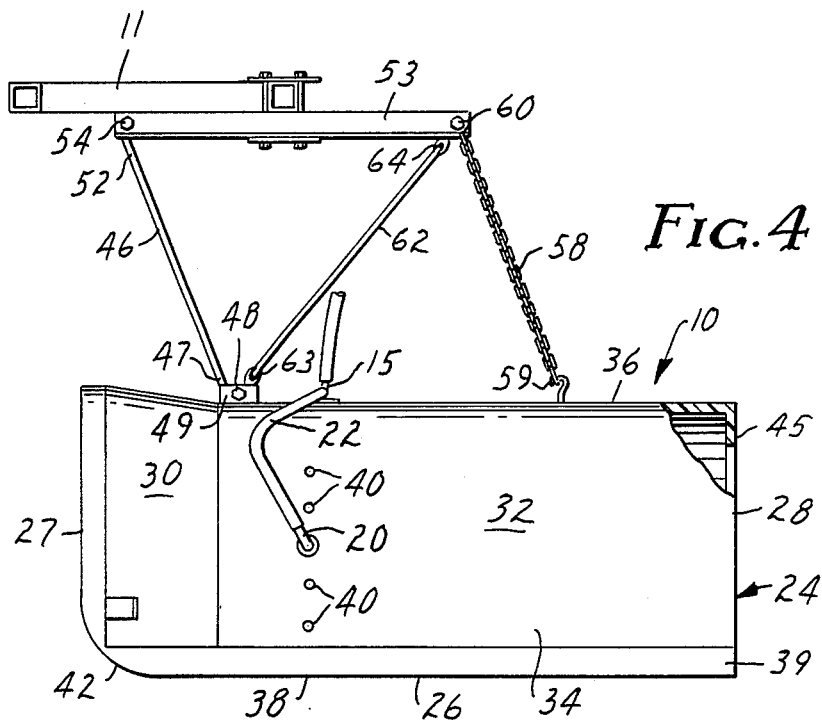
FIG. 4 is an opposite side view of the spray shield assembly shown in FIG. 2.
Figure 2:
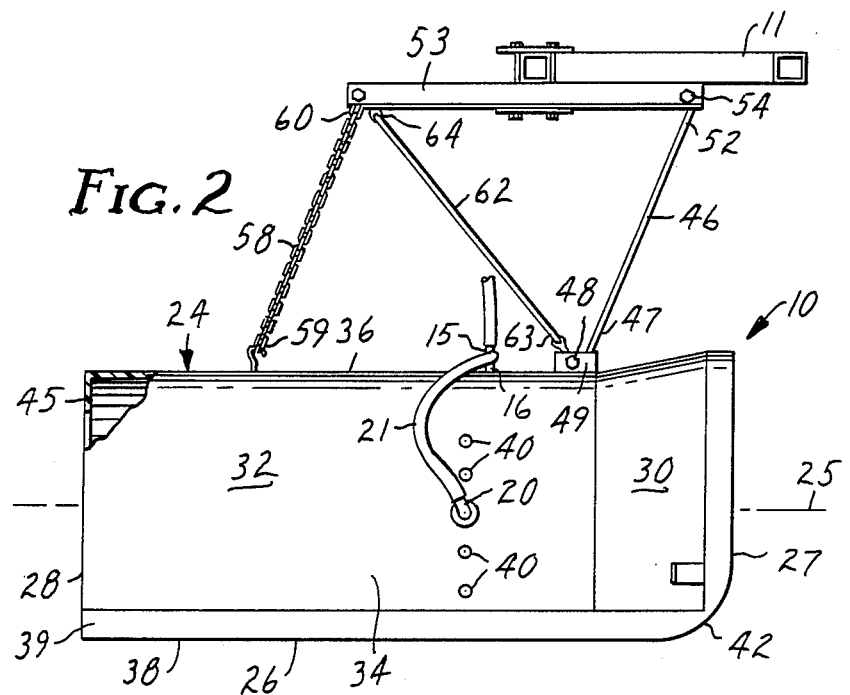
FIG. 2 is an enlarged side view of one of the spray shield assemblies shown in FIG. 1.
Figure 3:
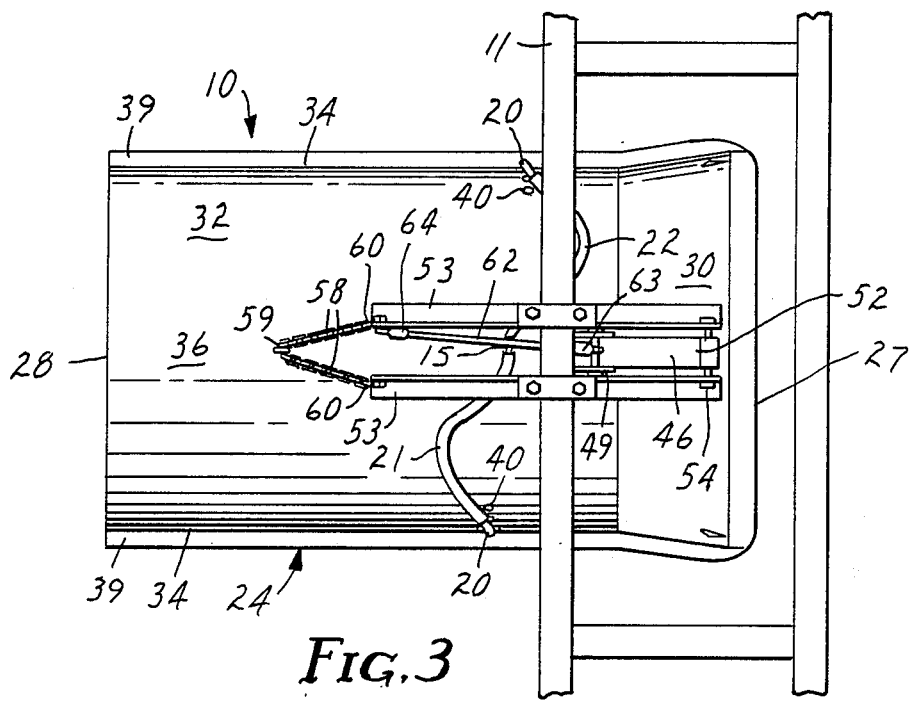
FIG. 3 is a top view of the spray shield assembly shown in FIG. 2.
Figures 5, 6:
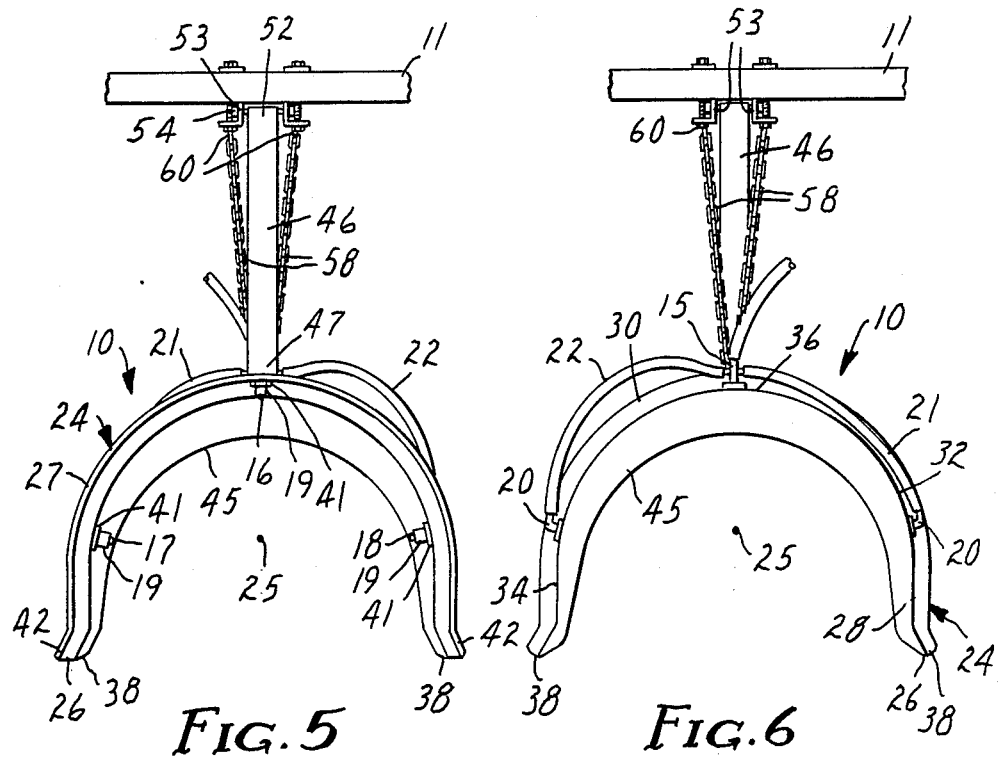
FIG. 5 is a front end view of the spray shield assembly shown in FIG. 2.
FIG. 6 is rear end view of the spray shield assembly shown in FIG. 2.
Figure 7:
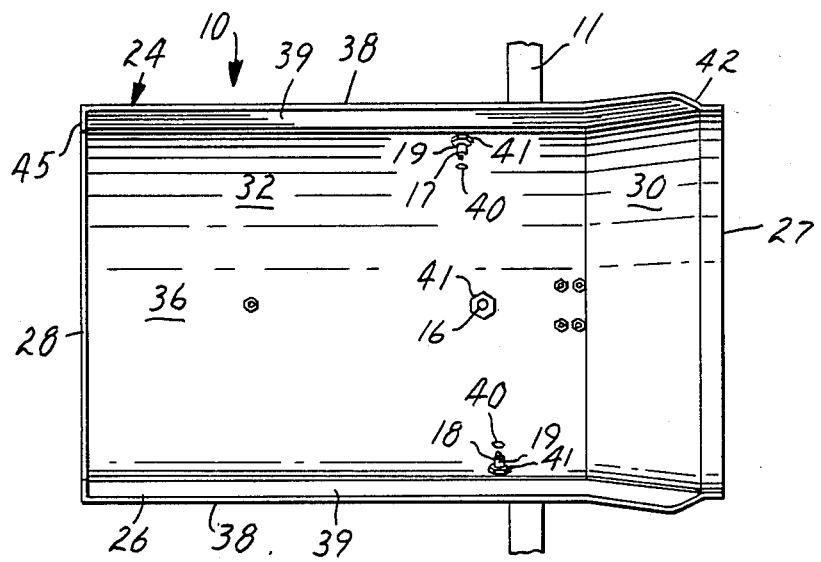
FIG. 7 is a bottom view of the spray shield assembly shown in FIG. 2.

Referring now to the drawing, there is shown in FIGS. 2 through 7 a spray shield assembly 10 according to the present invention, and FIG. 1 shows a plurality of such spray shield assemblies 10 attached to a frame 11 mounted on a tractor 12 in parallel positions in which the spray shield assemblies 10 can be moved by the tractor 12 over crops or plants planted in rows to temporarily enclose the crops or plants when liquids are sprayed onto them by a pumping system 13 carried by the tractor 12.

The spray shield assembly 10 comprises liquid distribution means including means for defining an inlet provided by one hose barb on a hollow four way connector 15 having three projecting hose barbs and a projecting male threaded portion (e.g., part No. T12C of nylon available from Precision Fitting and Valve, Eden Prairie, Minn.) and adapted to be coupled by a hose engaging said one of the hose barbs to the pumping system 13 on the tractor 12 which provides a source of liquid under pressure. The liquid distribution means includes at least two and preferably three liquid outlet nozzles 16, 17, and 18, (e.g., nozzles of the type provided under the trademark "TeeJet" by Spraying Systems Co., Wheaton, Ill.) and means including the four way connector 15 coupled to the nozzle 16 by a swivel nut 19 (e.g., part No. 8027 available from Precision Fitting and Valve, Eden Prairie, Minn.) around its threaded end portion and by its hose barbs to hoses 21 and 22 connected between the connector 15 and hose barbs on hollow elbows 20 having male threaded end portions (e.g., part No. NTL12 of nylon available from Precision Fitting and Valve, Eden Prairie, Minn.) in which the nozzles 17 and 18 are held by swivel nuts 19 for distributing liquid from the inlet at the connector 15 to the outlet nozzles 16, 17, and 18.

Also included in the spray shield assembly 10 is an elongate resiliently flexible polymeric shield 24 (e.g., made of about 0.48 centimeter (3/16 inch) thick polyethylene), which shield 24 is preferably made by spin or rotary molding to form two of the shields 24 together as a generally cylindrical part, and then cutting the shields 24 from each other, but which could also be made by injection molding. The shield 24 has a longitudinal axis 25 and defines an axially extending channel opening through one side 26 and front and rear axially spaced ends 27, 28 of the shield 24, in which channel the crops or plants are temporarily positioned as the shield 24 is moved over them. The shield 24 includes a leading portion 30 that converges axially from adjacent the front end 27 toward the rear end 28 of the shield 24 (e.g., at an angle in the range of about ten to twenty five degrees with respect to the axis 25) to, if necessary, help direct portions of plants into the channel; and a semi cylindrical portion 32 extending from the end of the leading portion 30 opposite the front end 27 of the shield 24 toward the rear end of the shield 24. The semi cylindrical portion 32 has spaced opposite side parts 34 joined by a central top part 36 and has spaced generally parallel edges 38 defined along narrow slightly outwardly turned flanges 39 along its side opposite the top part 36 that define the open side of the channel. Each of the side parts 34 has an array of five through openings 40 with the openings 40 in each array disposed in a line at about a right angle to the adjacent edge 38, and each disposed at a different distance from the adjacent edge 38.

Means are provided for mounting one of the outlet nozzles 17 or 18 in any one of the through openings 40 in each of the arrays to position the nozzles 17 and 18 with their outlet ends projecting from the inner surface of the spray shield 24 to direct spray from the nozzles 17 and 18 in generally opposite directions at desired orientations and locations relative to the edges 38 and thereby to the plants along the rows. The threaded end portions of the elbows are held in the openings by a flange on the elbow and a nut 41 (e.g., part No. B12 of nylon available from Precision Fitting and Valve, Eden Prairie, Minn.) engaging respectively the outer and inner surfaces of the shield 24. Either nozzle 17 or 18 can easily be relocated by removing it from one opening 40 in its array and positioning it in another after removing the nut 19 and the nozzle 17 or 18, and then the nut 41 threaded around the end portion of the elbow 20 that normally releasably retains the elbow 20 in one of the openings 40, and then again engaging the nut 41, nozzle 17 or 18 and nut 19 after the elbow 20 is positioned in the desired different opening 40. Such relocation will change both the spacing of the nozzle 17 or 18 from the adjacent edge 38, and, because of the curvature of the side part 34 in which it is located, change the orientation of the nozzle 17 or 18 from a somewhat downward orientation in the uppermost openings 40 in each array, to a more horizontal or slightly upward orientation in the lowermost openings 40 in each array, even though the spray from the nozzles 17 and 18 will still be directed in generally opposite directions. The spray pattern from each nozzle 17 or can further be adapted as desired to the type of plant or location on the plant at which the spray is to be directed by selecting nozzles 16, 17, or 18 that provide different spray patterns such as a circular or fan like pattern, nozzles with such types of patterns being well known in the art and available from Spraying Systems Co., Wheaton, Ill. The top part 36 also has a through opening through which the threaded end portion of the connector 15 projects with the third outlet nozzle 16 mounted therein by the swivel nut 19 and the threaded end portion held in the shield 24 by a nut 41 in the same manner described above for the elbows 20 so that the end portion of the nozzle 16 projects from the inner surface of the spray shield 24 and directs spray in generally at a right angle to the opposed directions in which spray from the nozzles 17 and 18 in the side parts 34 are directed. The openings 40 in each of the arrays and the central opening are spaced axially from each (e.g., by 2.54 centimeter or 1 inch) other along the longitudinal axis 25 of the shield 24 (see FIGS. 3 and 7) to restrict interference with liquid spray being discharged from the nozzles 16, 17, and 18.

The converging leading portion 30 of the shield has convex arcuate edges 42 extending from the edges 38 of the semi cylindrical portion 32 to the front end 27 of the shield 24 that provide arcuate cam surfaces (e.g., having radii in the range of about 1 to 2 inches), which cam surfaces diverge from the edges 38 toward the front end 27 along the leading portion 30 of the shield 24 so that they will both resiliently spread the side parts 34 of the spray shield 24 adjacent the arcuate edges 42 and lift the spray shield 24 upon engagement of the arcuate edges or cam surfaces 42 with an obstacle on the earth, thereby minimizing the impact on the shield 24 caused by such engagement.

The shield 24 has a crescent shaped flange 45 projecting radially inwardly at the rear end 28 of the shield 24 to restrict spreading of the side parts 34 adjacent the flange 45, and thereby help retain the shape of the shield 24 and minimize vibration in the shield 24 when it is in use.

Suspension means are also provided that are adapted for suspending the spray shield 24 from the frame 11. The suspension means comprises a rigid bar 46 having a first end 47 mounted in a clevis 49 bolted to the shield 24 along the outer surface of the top part 36 of the spray shield 24 adjacent its front end 27 for pivotal movement about a pivot axis defined by a bolt or pin 48 that extends through the bar 46 and clevis 49 normal to the axis of the shield 24 and generally parallel to a plane defined by the edges 38 on the shield 24. A second end 52 of the bar 46 opposite its first end 47 is mounted between two parallel angle brackets 53 extending axially of the shield 24 and attached to the frame 11 for pivotal movement about an axis defined by a pin or bolt 54 through the brackets 53 and bar 46 parallel to the pivot axis defined by the pin 48. Also included in the suspension means is a flexible non extensible member 58 provided by a doubled length of chain having a central portion defining a first end 59 attached by an eye bolt to the top part 36 of the shield 24 adjacent its rear end 28, and an opposite second end 60 defined by ends of the chain attached to the brackets 53 at locations spaced from the bolt 54; and a resiliently elastic member 62 having a first end 63 fastened to the pin 48 at the first end 47 of the bar 46 and an opposite second end 64 attached to one of the brackets 53 adjacent the second end 60 of the non extensible member 58, which elastic member 62 is stretched to provide tension between its points of attachment. The lengths of the bar 46 and non extensible and elastic members 58 and 62 and the tension that can be applied by the elastic member 62 upon stretching are selected and adapted so that the non extensible and resiliently elastic members 58 and 60 normally position the bar 46 so that a straight line extending through the axes defined by the pins 48 and 54 about which the ends 47, 52 of the bar 46 pivot and intersecting the longitudinal axis 25 of the shield 24 will define an acute angle on the side of that intersection adjacent the front end 27 of the shield 24. (e.g., an acute angle of about 60 degrees). With that arrangement, engagement of the arcuate edges 42 at the front end 27 of the shield 24 with an object or the ground will cause the shield 24 to move upward and rearward relative to the brackets 53 and frame 11 against the bias normally provided by its weight due to pivoting of the bar 46 about the axes defined by the bolts 48 and 54, thereby decreasing the acute angle described above, after which the shield will again return to its normal position under the influence of its weight.

One embodiment of the spray shield assembly 10 adapted for use on crop rows separated by about twenty two inches has an overall axial length of about 25 and ½ inches, a maximum width between its side parts 34 of about 12 and ½ inches and a semi cylindrical portion 32 with an axial length of about 21 inches; whereas another embodiment of the spray shield assembly 10 adapted for use on crop rows separated by between thirty to forty inches has an overall axial length of about 34 inches, a maximum width between its side parts 34 of about 17 and ¾ inches and a semi cylindrical portion 32 with an axial length of about 27 inches.

The present invention has now been described with reference to one embodiment thereof. It will be apparent to those skilled in the art that many changes can be made in the embodiment described without departing from the scope of the present invention. Thus the scope of the present invention should not be limited to the structures described in this application, but only by structures described by the language of the claims and the equivalents of those structures.

I claim:

1. A spray shield assembly adapted to be connected to a support frame moved over plants growing from the earth in parallel rows to temporarily enclose the plants while liquids are sprayed onto them, said spray shield assembly comprising:

liquid distribution means including means for defining an inlet adapted to be coupled to a source of liquid under pressure, at least two liquid outlet nozzles having outlet ends, and means for distributing liquid from said inlet to said outlet nozzles;

an elongate resiliently flexible polymeric shield having an longitudinal axis, axially spaced front and rear ends, and defining a channel opening through one side and said front and rear ends in which channel the plants are temporarily positioned as the shield is moved over them, said shield comprising a leading portion converging axially from adjacent the front end toward said second end of said shield, and a generally semi cylindrical portion extending from the end of said leading portion opposite the front end of the shield toward the rear end of said shield, said semi cylindrical portion having a generally cylindrically concave inner surface, a convex outer surface, opposite side parts joined by a top part between said side parts, spaced edges generally parallel to said axis that define the open side of the channel, and an array of openings through each of said side parts with the openings in each array each disposed at a different distance from the adjacent edge;

means attached to said top part for suspending said shield from the support frame with said edges adjacent the earth; and means for mounting each of said outlet nozzles in one of the through openings in a different one of said arrays to position the nozzles with their outlet ends projecting from the inside surface of the spray shield to direct spray in generally opposite directions at desired orientations relative to the edges and thereby to the plants along the rows.

2. A spray shield assembly according to claim 1 wherein said liquid distribution means further includes a third liquid outlet nozzle having an outlet end, said means for distributing includes means for distributing liquid from said inlet to said third outlet nozzle, said top part has a through opening, and said shield assembly includes means for mounting said third outlet nozzle in said through opening in said top part with the outlet end of the third nozzle projecting from the inner surface of the spray shield to direct spray generally at a right angle to the opposite directions in which spray from the nozzles in the side parts are directed.

3. A spray shield assembly according to claim 2 wherein said arrays and said central opening are spaced axially from each other along said longitudinal axis to restrict interference with liquid spray being discharged from said nozzles.

4. A spray shield assembly according to claim 3 wherein said shield has a crescent shaped flange projecting radially inwardly at the rear end of said shield to restrict spreading of said side parts adjacent said flange.

5. A spray shield assembly according to claim 1 wherein said converging leading portion has convex arcuate edges extending from said edges of said semi cylindrical portion to the front end of the shield to provide cam surfaces oriented to both resiliently spread the side parts of said spray shield adjacent said arcuate edges and lift said spray shield upon engagement of the cam surfaces with an obstacle on the earth.

6. A spray shield assembly according to claim 1 wherein said spray shield is spin molded of polypropylene and has a thickness between said inner and outer surfaces of about 0.48 centimeter (3/16 inch).

7. A spray shield assembly according to claim 1 wherein said means adapted for suspending said spray shield from said support frame comprises:
a rigid bar having a first end mounted along the outer surface of said top part adjacent said front end for pivotal movement about a pivot axis normal to the axis of said shield and generally parallel to a plane defined by said edges on said semi cylindrical portion, and having a second end opposite said first end adapted to be mounted relative to the support frame for pivotal movement about an axis parallel to said pivot axis;
a flexible non extensible member having a first end attached to the top part of said shield adjacent the rear end of the shield and an opposite second end adapted to be attached in fixed relationship to the support frame in a positions spaced axially of said shield from the second end of said bar; and
a resiliently elastic member having a first end fastened adjacent the first end of said bar and having an opposite second end adapted to be attached in fixed relationship to said support frame adjacent the second end of the non extensible member, the lengths of said bar and members and the elasticity of said elastic member being adapted so that with said spray shield suspended with said elastic member under tension said non extensible and resiliently elastic members normally position said bar so that a straight line extending through the axes about which the ends of the bar pivot and intersecting the axis of the shield will define an acute angle on the side of that intersection adjacent the front end of the shield.

8. A spray shield assembly according to claim 7 wherein said acute angle is about sixty degrees.

9. A spray shield assembly according to claim 1 wherein said leading portion converges from the front end of said shield at an angle in the range of about ten to twenty five degrees with respect to said longitudinal axis.

10. A spray shield assembly adapted to be connected to a support frame moved over plants growing from the earth in parallel rows to temporarily enclose the plants while liquids are sprayed onto them, said spray shield assembly comprising:
liquid distribution means including means for defining an inlet adapted to be coupled to a source of liquid under pressure, at least two liquid outlet nozzles having outlet ends, and means for distributing liquid from said inlet to said outlet nozzles;
an elongate resiliently flexible shield having an longitudinal axis, axially spaced front and rear ends, and defining a channel opening through one side and said front and rear ends in which channel the plants are temporarily positioned as the shield is moved over them, said shield comprising a generally semi cylindrical portion having a generally cylindrically concave inner surface, a convex outer surface, opposite side parts joined by a top part between said side parts, spaced edges generally parallel to said axis that define the open side of the channel, and an array of openings through each of said side parts with the openings in each array each disposed at a different distance from the adjacent edge;
means attached to said top part for suspending said shield from the support frame with said edges adjacent the earth; and
means for mounting each of said outlet nozzles in one of the through openings in a different one of said arrays to position the nozzles with their outlet ends projecting from the inside surface of the spray shield to direct spray in generally opposite directions at desired orientations relative to the edges and thereby to the plants along the rows.

11. A spray shield assembly according to claim 10 wherein said liquid distribution means further includes a third liquid outlet nozzle having an outlet end, said means for distributing includes means for distributing liquid from said inlet to said third outlet nozzle, said top part has a through opening, and said shield assembly includes means for mounting said third outlet nozzle in said through opening in said top part with the outlet end of the third nozzle projecting from the inner surface of the spray shield to direct spray generally at a right angle to the opposite directions in which spray from the nozzles in the side parts are directed.

12. A spray shield assembly according to claim 11 wherein said arrays and said central opening are spaced axially from each other along said longitudinal axis to restrict interference with liquid spray being discharged from said nozzles.

13. A spray shield assembly according to claim 10 wherein said shield has convex arcuate edges extending from said edges of said semi cylindrical portion to the front end of the shield to provide cam surfaces oriented to lift said spray shield upon engagement of the cam surfaces with an obstacle on the earth.

14. A spray shield assembly according to claim 10 wherein said shield has a crescent shaped flange projecting radially inwardly at the rear end of said shield to restrict spreading of said side parts adjacent said flange.

15. A spray shield assembly according to claim 10 wherein said spray shield is spin molded of polypropylene and has a thickness between said inner and outer surfaces of about 0.48 centimeter (3/16 inch).

16. A spray shield assembly according to claim 10 wherein said means adapted for suspending said spray shield from said support frame comprises:
- a rigid bar having a first end mounted along the outer surface of said top part adjacent said front end for pivotal movement about a pivot axis normal to the axis of said shield and generally parallel to a plane defined by said edges on said semi cylindrical portion, and having a second end opposite said first end adapted to be mounted relative to the support frame for pivotal movement about an axis parallel to said pivot axis;
- a flexible non extensible member having a first end attached to the top part of said shield adjacent the rear end of the shield and an opposite second end adapted to be attached in fixed relationship to the support frame in a positions spaced axially of said shield from the second end of said bar; and
- a resiliently elastic member having a first end fastened adjacent the first end of said bar and having an opposite second end adapted to be attached in fixed relationship to said support frame adjacent the second end of the non extensible member, the lengths of said bar and members and the elasticity of said elastic member being adapted so that with said spray shield suspended with said elastic member under tension said non extensible and resiliently elastic members normally position said bar so that a straight line extending through the axes about which the ends of the bar pivot and intersecting the axis of the shield will define an acute angle on the side of that intersection adjacent the front end of the shield.

17. A spray shield assembly according to claim 16 wherein said acute angle is about sixty degrees.

* * * * *